A. FRUWIRTH.
POSITIONING AND FOCUSING INDICATOR FOR ENLARGING AND REDUCING CAMERAS.
APPLICATION FILED AUG. 28, 1909.
971,367.
Patented Sept. 27, 1910.
2 SHEETS—SHEET 2.
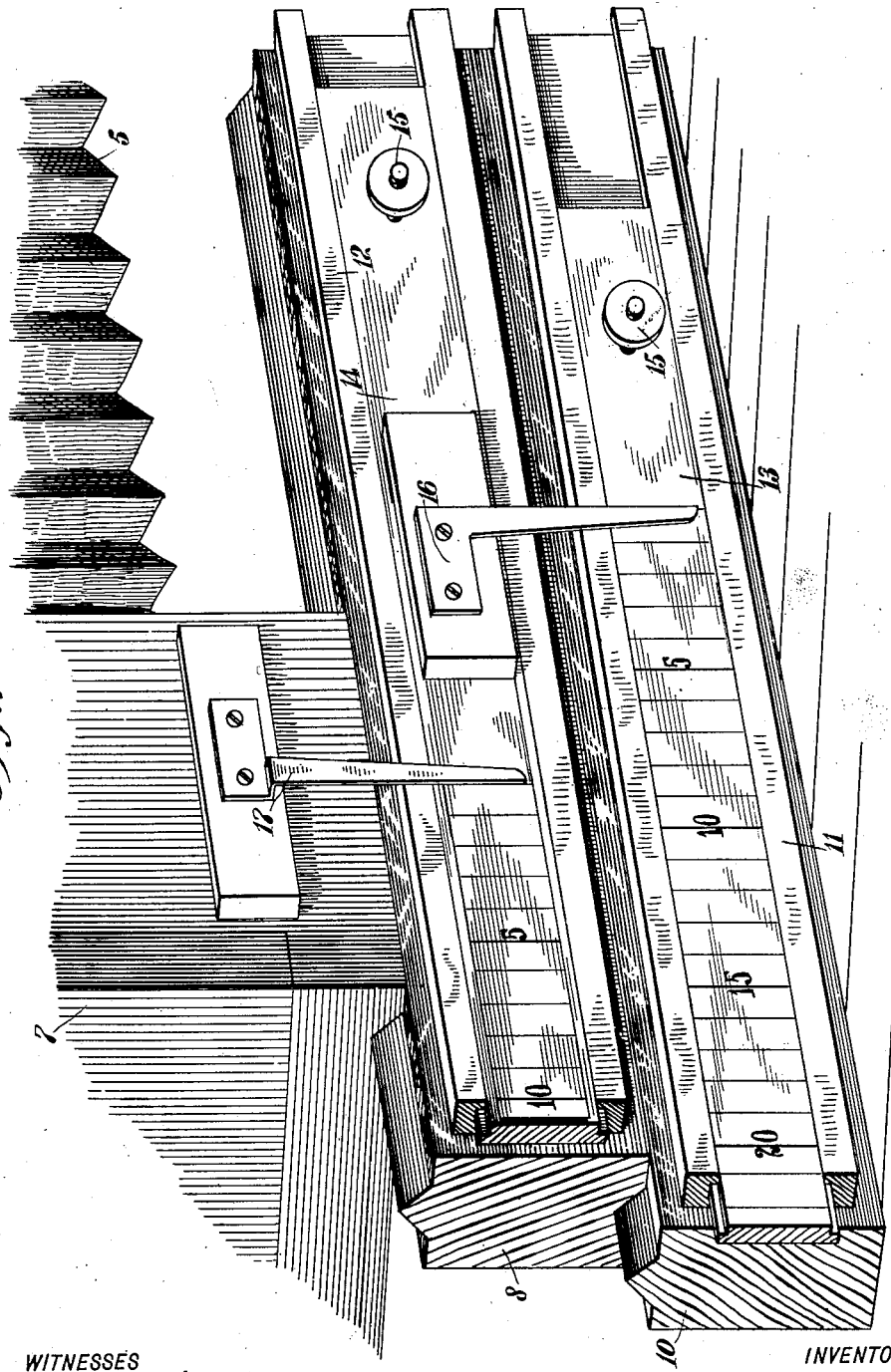
WITNESSES
INVENTOR
Arthur Fruwirth
BY
ATTORNEYS

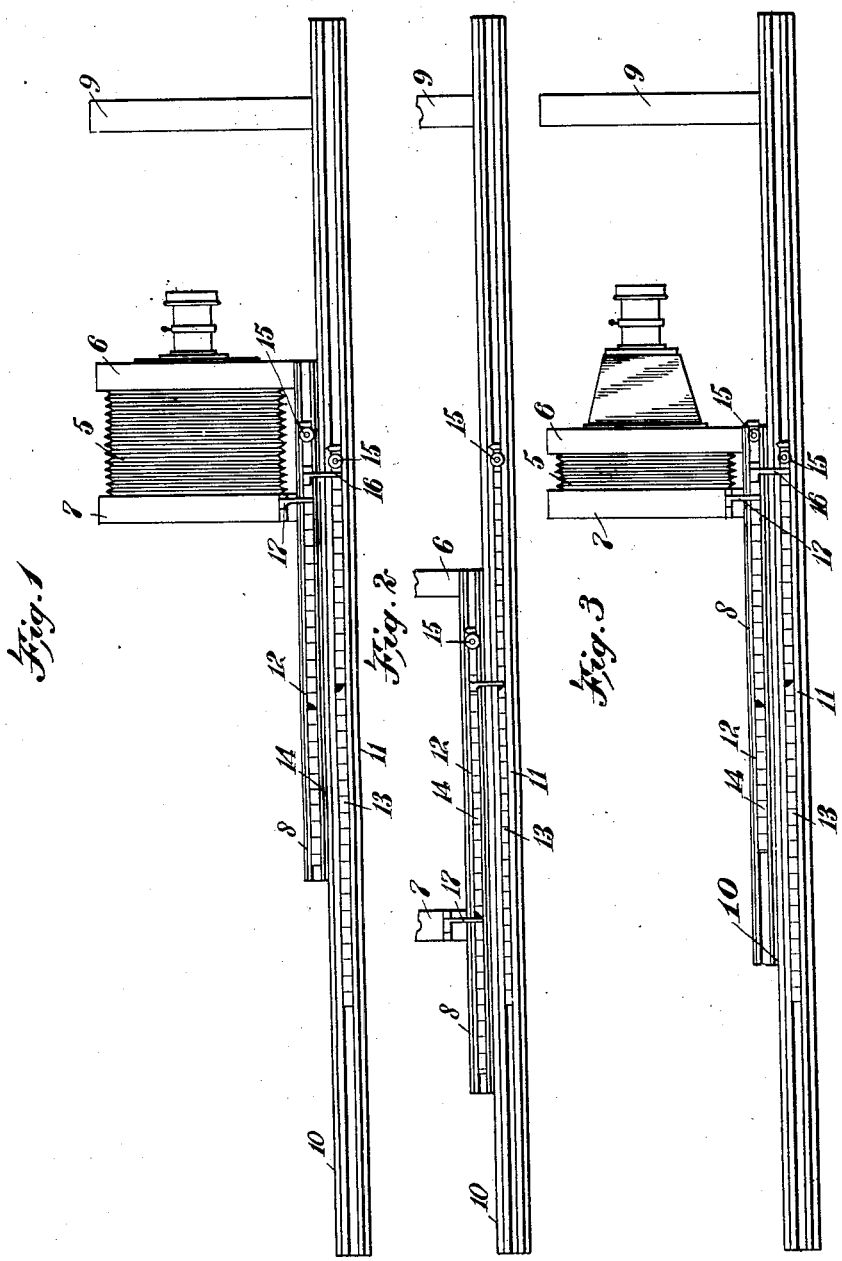

UNITED STATES PATENT OFFICE.

ARTHUR FRUWIRTH, OF NEW YORK, N. Y.

POSITIONING AND FOCUSING INDICATOR FOR ENLARGING AND REDUCING CAMERAS.

971,367.   Specification of Letters Patent.   Patented Sept. 27, 1910.

Application filed August 28, 1909. Serial No. 515,082.

*To all whom it may concern:*

Be it known that I, ARTHUR FRUWIRTH, a citizen of the United States, and a resident of the city of New York, borough of Brooklyn, in the county of Kings and State of New York, have invented a new and Improved Positioning and Focusing Indicator for Enlarging and Reducing Cameras, of which the following is a full, clear, and exact description.

The invention is an improvement in attachments for enlarging and reducing cameras, and has for its purpose to provide scales by which the lens and ground glass may be accurately set for any size enlargement or reduction within certain limits, while avoiding visual focusing and possible errors from this source, thus adapting the camera to be as effectively used for this character of work by an amateur as by a professional.

Reference is to be had to the accompanying drawings forming a part of this specification, in which similar characters of reference indicate corresponding parts in all the views.

Figure 1 is a side elevation of an enlarging and reducing camera having my improvements, showing the camera in the initial position for adjusting the scales; Fig. 2 is a similar view, with the camera proper and the copy-board broken away, and the camera adjusted for making a full size copy; Fig. 3 is a view similar to Fig. 2, showing the adjustment of the camera when an extension or cone is used to carry the lens; and Fig. 4 is an enlarged perspective view showing a fragment of the appliance in section.

For the purpose of illustrating the nature and application of my improvements I have shown an enlarging and reducing camera 5 having the front or lens frame 6 and the rear or ground glass frame 7, with the frames independently slidable on the camera bed 8 to and from a copy-board or positive carrier 9, and the camera bed likewise slidable on the camera support or stand 10.

In carrying out my invention I provide guides 11 and 12, each longitudinally grooved to slidably receive scales 13 and 14 respectively, the grooves being undercut to engage with the edges of the scales and prevent the scales from being separated from the guides laterally. The scales are graduated in accordance with the focal distance of the lens which is used on the camera, the scale 13 indicating the position of the lens relative to the copy-board or image to be photographed in making a picture of any prescribed size within certain limits, and the scale 14 being graduated to indicate the position of the camera ground glass in focusing the camera for the several positions of the lens, the graduations on the two scales indicating the proper position of the lens and ground glass respectively, to take a full size picture of the image, being preferably designated one hundred, and the graduations for each scale from the hundred mark extending to zero toward the copy-board and at a suitable distance within the focal limits of the camera to the opposite side of the hundred mark. Each scale is secured in adjusted position by a binding-screw or other suitable device 15, and the scale 13 is traversed by an indicator 16 carried by the scale 14, and the scale 14 traversed by an indicator 17 carried by the ground glass frame or negative carrier 7.

After the scales, guides, etc., are applied to the camera, the scales are set by adjusting the lens frame and ground glass frame on the bed 8 so that the camera will be in focus at an infinite distance, or the optical center of the lens located from the ground glass a distance equal to the equivalent focus of the lens, and positioning the lens or optical center of the lens a like distance from the copy-board. Both scales are then slid until their zero marks are brought into register with their respective indicators, after which the thumb-screws 15 are tightened. With the scales thus properly adjusted, if it is desired to set the camera to take a picture of a print or other configuration on the copy-board, of any relative size, the camera bed is slid on the camera stand until the indicator 16 is in register with the proper graduation on the scale 13, placing the lens at the required distance from the image, and the ground glass frame is adjusted on the bed of the camera until the indicator 17 is carried to the corresponding graduation of the scale 14, placing the ground glass in focus. Thus, for example, should a full size photograph of the configuration be required, the camera bed is slid on the camera stand until the indicator 16 is brought to the one hundred mark of the scale 13, and the ground glass frame 7 is slid on the camera bed until the indicator 17 is in register with the hundred mark of the scale 14. To make an enlargement, the lens of the camera is obviously carried closer to the copy-board and the ground glass frame moved farther out, and in a reduction of the picture the reverse adjustments are performed.

In practice, a special gage or measuring device will be furnished in connection with each set of scales for the particular camera lens, the said gage giving the distance from the inner face of the copy-board to the face of the lens and from the face of the lens to the ground glass of the camera when the camera is in initial position for setting the scales. With such a gage the scales may be expeditiously and accurately adjusted, even though the lens be placed on another camera or the camera be supplied with an extension or cone for carrying the lens, as shown in Fig. 3.

Having thus described my invention, I claim as new and desire to secure by Letters Patent:

1. The combination of a camera stand, a camera bed slidable on the stand, a camera slidable on the bed, a scale carried by the stand, indicating the position of the camera lens to make a photograph of an image located at a prescribed distance, of any required proportionate size within certain limits, a scale carried by the bed, graduated to indicate the position of the camera ground glass in focusing the camera for the several positions of the lens, an indicator carried on the last mentioned scale, traversing the first-named scale, and an indicator carried by the negative carrier of the camera, traversing said last mentioned scale.

2. The combination of a camera stand, a camera bed adjustable on the stand, an enlarging and reducing camera adjustable on the bed, guides respectively carried by the stand and bed, a scale adjustable on the guide carried by the stand and graduated to indicate the position of the camera lens to make a photograph of an image located at a prescribed point, of any required proportionate size within certain limits, and a scale adjustable on the guide carried by the bed and graduated to indicate the position of the camera ground glass in focusing the camera for the several positions of the lens.

3. The combination of a camera stand, a camera bed slidable on the stand, a camera slidable on the bed, guides respectively carried on the adjacent edges of the stand and bed, a scale adjustable in the guide carried by the stand and indicating the position of the camera lens to make a photograph of an image located at a prescribed distance, of any required proportionate size within certain limits, a scale adjustable in the guide carried by the bed and graduated to indicate the position of the camera ground glass in focusing the camera for the several positions of the lens, and indicators respectively carried by the negative carrier of the camera and the scale of the bed, and respectively traversing the scale of the bed and the scale of the stand.

In testimony whereof I have signed my name to this specification in the presence of two subscribing witnesses.

ARTHUR FRUWIRTH.

Witnesses:
CARL WITTMANN,
LOTHAR E. FETZER.